United States Patent [19]

Kurtz

[11] 4,348,349
[45] Sep. 7, 1982

[54] METHOD FOR REDUCING MELT FRACTURE DURING EXTRUSION OF A MOLTEN NARROW MOLECULAR WEIGHT DISTRIBUTION, LINEAR, ETHYLENE COPOLYMER

[75] Inventor: Stuart J. Kurtz, Martinsville, N.J.

[73] Assignee: Union Carbide Corporation, Danbury, Conn.

[21] Appl. No.: 192,701

[22] Filed: Oct. 1, 1980

[51] Int. Cl.³ .............................................. B29D 23/04
[52] U.S. Cl. ..................................... 264/564; 264/171;
264/173; 264/176 R; 264/209.1; 264/209.7;
264/209.8; 264/216; 425/131.1; 425/133.1;
425/326.1; 425/380; 526/124; 526/128
[58] Field of Search .................................. 264/563–569,
264/209.1, 209.8, 209.7, 540, 171, 173, 216, 176
R; 425/380, 133.1, 131.1, 326.1, 72 R; 526/124,
128

[56] References Cited

U.S. PATENT DOCUMENTS

| | | | |
|---|---|---|---|
| 3,023,461 | 3/1962 | Sherman | 425/326.1 |
| 3,574,808 | 4/1971 | Matthews et al. | 264/209.8 |
| 3,784,661 | 1/1974 | Schaul et al. | 264/540 |
| 3,876,740 | 4/1975 | Egli et al. | 264/209.1 |
| 3,879,158 | 4/1975 | Schele | 425/380 |
| 3,920,782 | 11/1975 | Cogswell | 264/209.7 |
| 4,021,170 | 5/1977 | Anderson et al. | 264/209.1 |
| 4,093,692 | 6/1978 | Hill | 264/540 |
| 4,187,269 | 2/1980 | Hutchinson et al. | 264/209.1 |
| 4,203,942 | 5/1980 | Sims, Jr. et al. | 264/565 |
| 4,243,619 | 1/1981 | Fraser et al. | 264/564 |
| 4,267,146 | 5/1981 | Kurtz et al. | 264/564 |
| 4,282,177 | 8/1981 | Kurtz et al. | 264/564 |

Primary Examiner—Jeffery R. Thurlow
Attorney, Agent, or Firm—Clement J. Vicari

[57] ABSTRACT

A process for reducing melt fracture formed during extrusion of a molten narrow molecular weight distribution, linear, ethylene polymer, which comprises extruding said polymer through a die having a discharge outlet defining an exit die gap formed by opposing die lip surfaces and wherein one surface of the die lip and/or die land in contact with the molten polymer extends beyond the opposing surface of the die lip and/or die land in the direction of the axis of flow of the molten polymer through the die exit whereby melt fracture is reduced on the surface of the polymer leaving the extended die lip surface.

15 Claims, 4 Drawing Figures

METHOD FOR REDUCING MELT FRACTURE DURING EXTRUSION OF A MOLTEN NARROW MOLECULAR WEIGHT DISTRIBUTION, LINEAR, ETHYLENE COPOLYMER

FIELD OF THE INVENTION

This invention relates to a method for reducing melt fracture, particularly sharkskin melt fracture, during extrusion of a molten narrow molecular weight distribution, linear, ethylene copolymer, under conditions of flow rate and melt temperature which would otherwise produce such melt fracture.

In another aspect, this invention relates to a method for reducing melt fracture during extrusion of a molten narrow molecule weight distribution liner ethylene copolymer which when extruded forms a surface layer of a multilayer film.

BACKGROUND OF THE INVENTION

Conventional low density polyethylene has been historically polymerized in heavy walled autoclaves or tubular reactors at pressures as high as 50,000 psi and temperatures up to 300° C. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

With recent developments in low pressure technology, low density polyethylene can now be produced at low pressures and temperatures by copolymerizing ethylene with various alphaolefins. These low pressure LDPE (LP-LDPE) resins generally possess little, if any, long chain branching. They are short chain branched with branch length and frequency controlled by the type and amount of comonomer used during polymerization.

U.S. patent application Ser. No. 892,325 filed Mar. 31, 1978, now abandoned, and refiled as Ser. No. 014,414 on Feb. 27, 1979, now U.S. Pat. No. 4,302,566, in the names of F. J. Karol et al. and entitled Preparation of Ethylene Copolymers In Fluid Bed Reactor, discloses that ethylene copolymers, having a density of 0.91 to 0.96, a melt flow ratio of $\geq 22$ to $\leq 32$ and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. patent application Ser. No. 892,322 filed Mar. 31, 1978, now abandoned, and refiled as Ser. No. 012,720 on Feb. 16, 1979, now U.S. Pat. No. 4,302,565, in the names of G. L. Goeke et al. and entitled Impregnated Polymerization Catalyst, Process For Preparing, and Use For Ethylene Copolymerization discloses that ethylene copolymers, having a density of 0.91 to 0.96, a melt flow rate of $\geq 22$ to $\leq 32$ and a relatively low residual catalyst content can be produced in granular form, at relatively high productivities, if the monomer(s) are copolymerized in a gas phase process with a specific high-activity Mg-Ti-containing complex catalyst which is impregnated in a porous inert carrier material.

U.S. patent application Ser. No. 892,037 filed Mar. 31, 1978, now abandoned, and refiled as Ser. No. 014,412 on Feb. 27, 1979, in the names of B. E. Wagner et al. and entitled Polymerization Catalyst, Process For Preparing And Use For Ethylene Homopolymerization, discloses that ethylene homopolymers having a density of about $\geq 0.958$ to $\leq 0.972$ and a melt flow ratio of about $\geq 22$ to about $\leq 32$ which have a relatively low residual catalyst residue can be produced at relatively high productivities for commercial purposes by a low pressure gas phase process if the ethylene is homopolymerized in the presence of a high-activity Mg-Ti-containing complex catalyst which is blended with an inert carrier material. The granular polymers thus produced are useful for a variety of end-use applications.

The polymers as produced, for example, by the processes of said applications using the Mg-Ti containing complex catalyst possess a narrow molecular weight distribution, Mw/Mn, of about $\geq 2.7$ to $\leq 4.1$.

Over the years, film extrusion equipment has been optimized for the rheology of HP-LDPE. The different molecular architecture of LP-LDPE results in a film processing behavior which requires different extrusion parameters. Although LP-LDPE resins can be extruded on equipment designed for HP-LDPE resins, certain equipment modifications are often required in order to extrude the low pressure resins at optimum conditions and at rates comparable to the high pressure resins. This is particularly true during extrusion of LP-LDPE which is processed into film. The problem appears to be that during extrusion of these particular resins, two aspects or rheological behavior play a significant role, i.e. shear and extension. Within a film extruder and extrusion die, a polymeric melt undergoes severe shearing deformation. As the extrusion screw pumps the melt to, and through, the film die, the melt experiences a wide range of shear rates. Most film extrusion processes are thought to expose the melt to shear at rates in the 100–5000 sec$^{-1}$ range. Polymeric melts are known to exhibit what is commonly termed shear thinning behavior, i.e., non-Newtonian flow behavior. As shear rate is increased, viscosity (the ratio of shear stress, $\tau$, to shear rate, $\gamma$) decreases. The degree of viscosity decrease depends upon the molecular weight, its distribution, and molecular configuration, i.e., long chain branching of the polymeric material. Short chain branching has little effect on shear viscosity. In general, high pressure low density polyethylenes have a broad molecular weight distribution and show enhanced shear thinning behavior in the shear rate range common to film extrusion. The narrow molecular weight distribution resins used in the present invention exhibit reduced shear thinning behavior at extrusion grade shear rates. The consequences of these differences are that the narrow distribution resins used in the present invention require higher power and develop higher pressures during extrusion than the high pressure low density polyethylene resins of broad molecular weight distribution and of equivalent average molecular weight.

The rheology of polymeric materials is customarily studied in shear deformation. In simple shear the velocity gradient of the deforming resin is perpendicular to the flow direction. The mode of deformation is experimentally convenient but does not convey the essential information for understanding material response in film fabrication processes. As one can define a shear viscosity in terms of shear stress and shear rate, i.e.:

$$\eta\text{shear} = \tau_{12}/\dot{\gamma}$$

where
$\eta\text{shear}$ = shear viscosity (poise)
$\tau_{12}$ = shear stress (dynes/cm$^2$)
$\dot{\gamma}$ = shear rate (sec$^{-1}$)
an extensional viscosity can be defined in terms of normal stress and strain rate, i.e.,:

$$\eta\text{ext} = \pi/\dot{\epsilon}$$

$\rho\text{ext}$ = extensional viscosity (poise)
$\pi$ = normal stress (dynes/cm$^2$)
$\dot{\epsilon}$ = strain rate (sec$^{-1}$)

Due to the high shear stress developed during extrusion of a high molecular weight ethylene polymer having a narrow molecular weight distribution, melt fracture, particularly sharkskin melt fracture, occurs. Sharkskin melt fracture has been described in the literature for a number of polymers. "Sharkskin" is a term used to describe a particular type of surface irregularity which occurs during extrusion of some thermoplastic materials under certain conditions. It is characterized by a series of ridges perpendicular to the flow direction and is described by J. A. Brydson, *Flow Properties of Polymer Melts*, Van Nostrand-Reinhold Company (1970), pages 78–81.

In the present process, the onset of sharkskin melt fracture is determined by visual observation of the surface of an extrudate formed without take-off tension from a capillary die. Specifically, this procedure for determining sharkskin melt fracture is as follows: The extrudate is lighted from the side and examined under a 40X magnification microscope. The microscope shows the transition from a low-shear, glossy surface of the extrudate to a critical-shear, matted surface (the onset of sharkskin melt fracture) to a high-shear, deep ridge, sharkskin melt fracture. This method is generally reproducible to ±10 percent in shear stress.

The narrow molecular weight distribution ethylene polymers as described herein exhibit the characteristics of sharkskin melt fracture upon extruding using the prior art extrusion processes. These characteristics include a pattern of wave distortion perpendicular to the flow direction; occurrence at low extrusion rates (less than expected for elastic turbulance); not effected by the use of commonly employed metal die materials; and less melt fracture with increasing temperature.

There are several known methods for eliminating sharkskin melt fracture in polymers. These methods include increasing the resin temperature. However, in film formation this method is not commercially useful since increasing resin temperature generally causes lower rates of film formation, due to bubble instability or heat transfer limitations. Another method for eliminating sharkskin is described in U.S. Pat. No. 3,920,782. In this method sharkskin formed during extrusion of polymeric materials is controlled or eliminated by cooling an outer layer of the material to close to the fusion temperature so that it emerges from the die with a reduced temperature while maintaining the bulk of the melt at the optimum working temperature. However, this method is difficult to employ and control.

The invention of U.S. Pat. No. 3,920,782 is apparently based on the inventor's conclusions that the onset of sharkskin melt fracture under his operating conditions with his resins is a function, basically, of exceeding a critical linear velocity with his resins through his dies at his operating temperatures. In the process of the present invention, however, the onset of sharkskin melt fracture in the present applicants' resins under their operating conditions is a function, primarily, of exceeding a critical shear stress, and, to a lesser extent, a function of exceeding a critical linear velocity.

More recent attempts have been made to reduce sharkskin melt fracture during extrusion of the particular ethylene polymers disclosed herein by geometric changes in the die. For example Application Ser. No. 099,061 filed on Dec. 12, 1979 now U.S. Pat. No. 4,282,177 issued Aug. 4, 1981 and which is a continuation-in-part of Application Ser. No. 001,932 filed Jan. 8, 1979, now U.S. Pat. No. 4,267,146 issued May 12, 1981 discloses a method for reducing sharkskin melt fracture during extrusion of a molten narrow molecular weight distribution linear ethylene polymer by extruding the polymer through a die having a die gap greater than about 50 mils and wherein at least a portion of one surface of the die lip and/or die land in contact with the molten polymer is at an angle of divergence or convergence relative to the axis of flow of the molten polymer through the die. In addition, Application Ser. No. 012,793 filed on Feb. 16, 1979 now U.S. Pat. No. 4,271,092, discloses a process for forming blown tubular film essentially free of melt fracture by extruding the particular polymer through an extrusion die having a die gap of greater than about 50 mils and at a drawdown ratio of greater than about 2 to less than about 250.

In the process of the present invention melt fracture, particularly sharkskin melt fracture, can be virtually eliminated on one surface of an extruded film formed from the polymers contemplated herein, by geometric changes in the die, i.e., by extruding the narrow molecular weight distribution ethylene polymer, at normal film extrusion temperatures through a die having a discharge outlet defining an exit die gap and wherein one surface of the die lip and/or die land in contact with the molten polymer extends beyond the opposing surface of the die lip and/or die land in the direction of the axis of flow of the molten polymer through the die land whereby melt fracture is reduced on the surface of the polymer leaving the extended die lip surface. The utility of the process of the present invention arises due to the fact that the stress field at the exit of the die determines the creation of sharkskin melt fracture. Thus, sharkskin melt fracture can be controlled or eliminated by the geometry at the exit of the die and is independent of die land conditions.

Films suitable for packaging applications must possess a balance of key properties for broad end-use utility and wide commercial acceptance. These properties include film optical quality, for example, haze, gloss, and see-through characteristics. Mechanical strength properties such as puncture resistance, tensile strength, impact strength, stiffness, and tear resistance are important. Vapor transmission and gas permeability characteristics are important considerations in perishable goods packaging. Performance in film converting and packaging equipment is influenced by film properties such as coefficient of friction, blocking, heat sealability and flex resistance. Low density polyethylene has a wide range of utility such as in food packaging and non-food packaging applications. Bags commonly produced from low density polyethylene include shipping sacks, textile bags, laundry and dry cleaning bags and trash bags. Low density polyethylene film can be used as drum liners for a number of liquid and solid chemicals and as protective wrap inside wooden crates. Low density polyethylene film can be used in a variety of agricultural and horticultural applications such as protecting plants and crops, as mulching, for storing of fruits and vegetables. Additionally, low density polyethylene film can be used in building applications such as a moisture or moisture vapor barrier. Further, low density polyethylene film can be coated and printed for use in newspapers, books, etc.

Possessing a unique combination of the aforedescribed properties, high pressure low density polyethylene is the most important of the thermoplastic packaging films. It accounts for about 50% of the total usage of such films in packaging. Films made from the polymers of the present invention, preferably the ethylene hydrocarbon copolymers, offer an improved combination of end-use properties and are especially suited for many of the applications already served by high pressure low density polyethylene.

An improvement in any one of the properties of a film such as elimination or reduction of sharkskin melt fracture or an improvement in the extrusion characteristics of the resin or an improvement in the film extrusion process itself is of the utmost importance regarding the acceptance of the film as a substitute for high pressure low density polyethylene in many end use applications.

In the case where a single layer film is extruded consisting entirely of LP-LDPE resin, the reduction in melt fracture would occur on the surface of the film in contact with the extended surface of the die. For this reason, the process of the present invention is particularly suitable for the formation of multilayer films wherein one layer is formed of LP-LDPE and another layer is formed from a resin which under the conditions of operation is not subject to melt fracture. Thus, by the process of the instant invention, the LP-LDPE resin can be passed through the die in contact with the extended die lip surface whereas the resin not subject to melt fracture is extruded in contact with the shorter exit die lip surface thereby producing a multi-layer film, both outer surfaces of which would be free of melt fracture.

DRAWINGS

SUMMARY OF THE INVENTION

It has now been found that melt fracture, particularly sharkskin melt fracture formed during extrusion of a molten narrow molecular weight distribution, linear, ethylene polymer, at normal film extrusion temperature can be substantially eliminated or significantly reduced by extruding said polymer through a die having a discharge outlet defining an exit die gap and wherein one surface of the die lip and/or die land in contact with the molten polymer extends beyond the opposing surface of the die lip and/or die land in the direction of the axis of flow of the molten polymer through the die exit whereby melt fracture is reduced on the surface of the film leaving the extended die lip surface.

DESCRIPTION OF THE PREFERRED EMBODIMENT DIES

The molten ethylene polymer is extruded through a die, preferably an annular die, having an extended die lip which extends from about 0.010 inch to 0.400 inch and preferably about 0.050 inch to about 0.250 inch beyond the opposing die exit surface. The die which may be used in the present invention may be a spiral annular die, slit die, etc.

Figure 1:
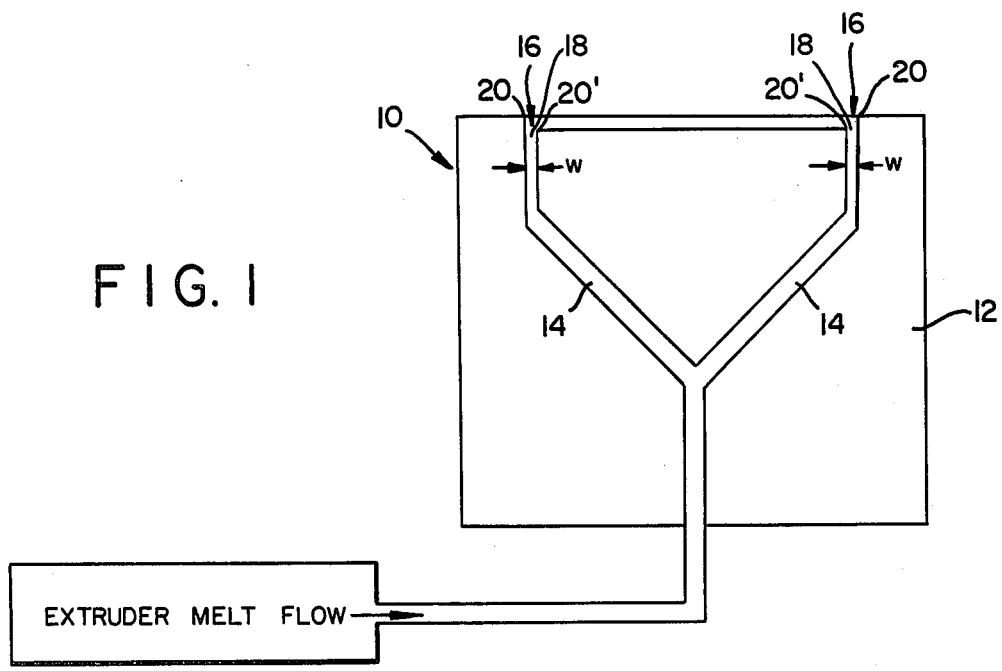
FIG. 1 shows a cross-section of a spiral/spider annular die for producing mono-layer film.

FIG. 1 is a cross-sectional view of a spiral/spider annular die 10 through which the molten thermoplastic ethylene polymer is extruded to form a single layer film, tube or pipe. Die block 12 contains channels 14 for directing the polymer to the die exit. As the molten thermoplastic ethylene polymer is extruded, it spreads out as it passes into the die channels 14.

Figure 2:
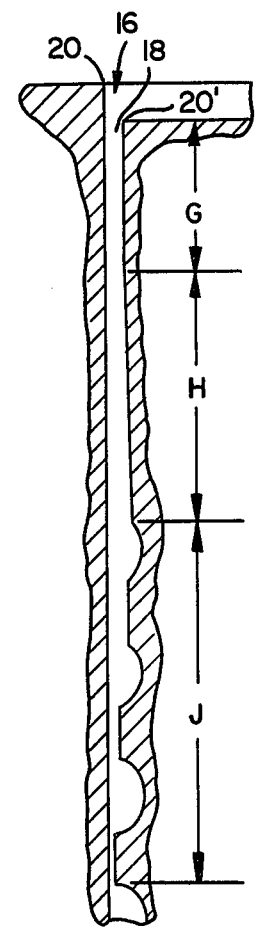
FIG. 2 shows a cross-section of a spiral die showing the offset configuration.

Referring to FIG. 2, which is a cross-section of a spiral die, there is indicated a spiral section J land entry section H and die land G. With reference to FIGS. 1 and 2, at the exit of the die, there is a die discharge outlet identified generally by reference numeral 16. The discharge outlet defines an exit die gap 18 which is formed by opposing surfaces of die lips 20 and 20'.

It will be seen that the die lip 20 is offset from the outer edge of the die lip 20', and this offset should generally be sufficient to significantly reduce or eliminate melt fracture. Generally a distance of about 0.010 inch to about 0.400 inch is operable and preferably about 0.050 inch to about 0.250 inch. The distance W which represents the dimensions of the die gap 18 can vary between 0.015 to about 0.200 inch and preferably from about 0.020 inch to about 0.10 inch.

Figure 3:
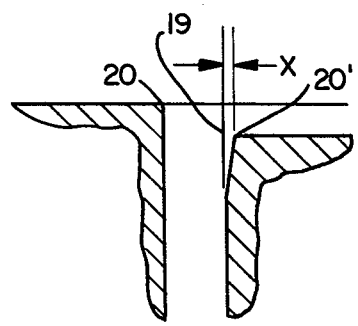
FIG. 3 is a modification of FIG. 2 showing the offset configuration and also illustrating a tapering of the non-extended die lip.

As best seen in FIG. 2, the die lips can be in substantially parallel relation. Preferably, however, and as shown in FIG. 3, the non-extended die lip 20' can in fact be tapered away from the surface of extended die lip 20 so as to provide a diverging surface which can diverge at an angle of preferably less than 5 degrees as shown by X which represents the distance between line 19 and the outer edge of die lip 20'.

Although the extended die lip 20 is shown in connection with the outer surface, it will be understood that the extended die lip can be on the inner surface in which case the geometry of the die exit would be reversed.

The above dies are particularly suitable for extruding single layer tubes or film wherein it is desired to have one surface of the film free of melt fracture in which case the desired melt free surface would be obtained by contacting the extended die lip surface 20 during extrusion. It will be further understood that die lips which converge or diverge is a known expedient in the art as disclosed in application Ser. No. 099061 filed Dec. 12, 1979, now U.S. Pat. No. 4,282,177. However, it has been found that if the offset die concept is utilized in conjunction with the tapered lip or pin concept, superior results are obtained.

Figure 4:
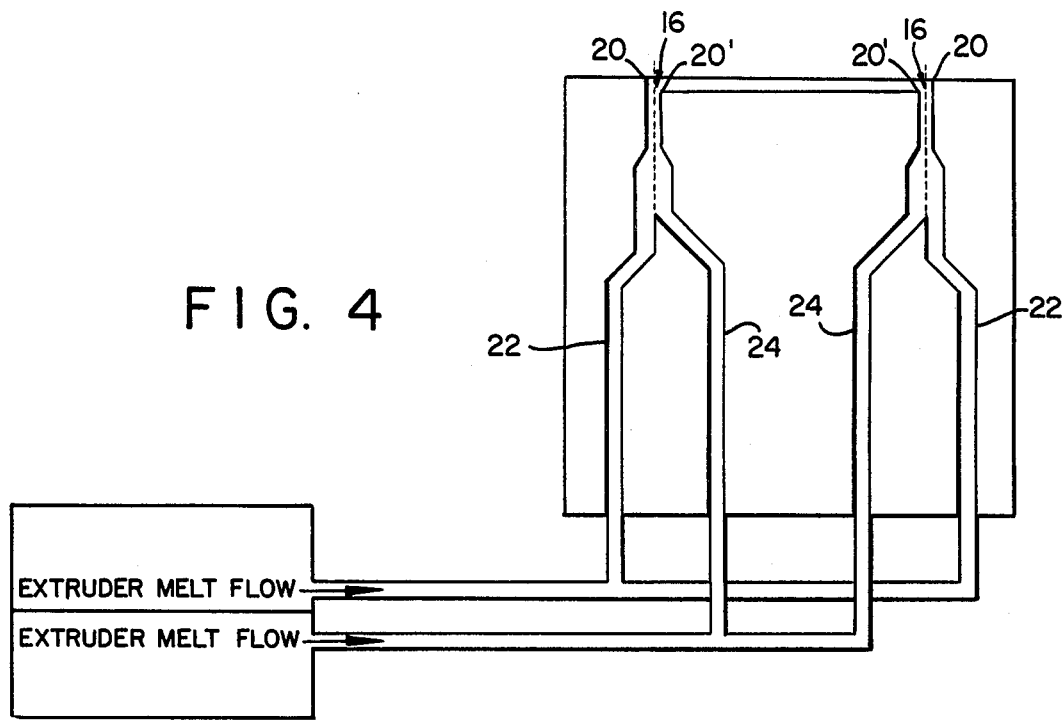
FIG. 4 shows a general schematic of a portion of an annular die for producing two-layer film embodying the offset configuration feature of the instant invention.

As mentioned previously, the present method is particularly suitably for the formation of multi-layer films wherein one layer is formed of LP-LDPE and another layer is formed from a resin which under the conditions of operation is not subject to melt fracture. Referring particularly to FIG. 4, wherein like parts have like reference numerals with reference to FIGS. 1 and 2, there is illustrated a general schematic of a portion of an annular die for producing two-layer films which is well known in the art but modified to show the offset concept. Thus, in order to produce two-layer film, for example, the LP-LDPE resin which is subject to melt fracture is directed through channel 22 and the other resin (not subject to melt fracture) is directed through channel 24 where they ultimately merge prior to exit from the die. As will be seen from FIG. 4, the resin subject to melt fracture, is in contact with the surface of the extended die lip whereas the other resin is in contact with the other die lip. This geometric arrangement and technique of operation permits a melt free surface on both sides of the two-layer film.

FILM EXTRUSION

I. Blown Film Extrusion

The films formed as disclosed herein may be extruded by tubular blown film extrusion process. In this process a narrow molecular weight distribution polymer is melt extruded through an extruder. This extruder may have an extrusion screw therein with a length to diameter ratio of between 15:1 to 21:1, as described in U.S. Patent Application Ser. No. 940,005, filed Sept. 6, 1978, now abandoned, and refiled as Ser. No. 064,399 on Aug. 8, 1979, in the names of John C. Miller, et al., and entitled "A Process For Extruding Ethylene Polymers". This application describes that this extrusion screw contains a feed, transition and metering section. Optionally, the extrusion screw can contain a mixing section such as that described in U.S. Pat. Nos. 3,486,192; 3,730,492 and 3,756,574, which are incorporated herein by reference. Preferably, the mixing section is placed at the screw tip.

The extruder which may be used herein may have a 18:1 to 32:1 length to internal diameter barrel ratio. The extrusion screw used in the present invention may have a length to diameter ratio of 15:1 to 32:1. When, for example, an extrusion screw of a length to diameter ratio of 18/1 is used in a 24/1 extruder, the remaining space in the extrusion barrel can be partially filled with various types of plugs, torpedoes, or static mixers to reduce residence time of the polymer melt.

The molten polymer is then extruded through a die, as will hereinafter be described.

The polymer is extruded at a temperature of about 325° to about 500° F. The polymer is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion to the tubular film. The degree of expansion, as measured by the ratio of the fully expanded tube circumference to the circumference of the die annulus, is in the range 1/1 to 6/1 and preferably, 1/1 to 4/1. The tubular extrudate is cooled by conventional techniques such as, by air cooling, water quench or mandrel.

The drawdown characteristics of the polymers disclosed herein are excellent. Drawdown, defined as the ratio of the die gap to the product of film gauge and blow up ratio, is kept greater than about 2 to less than about 250 and preferably greater than about 25 to less than about 150. Very thin gauge films can be produced at high drawdown from these polymers even when said polymer is highly contaminated with foreign particles and/or gel. Thin gauge films of about 9.5 to 3.0 mils can be processed to exhibit ultimate elongations MD greater than about 400% to about 700% and TD greater than about 500% to about 700%. Furthermore, these films are not perceived as "splitty". "Splittiness" is a qualitative term which describes the notched tear response of a film at high deformation rates. "Splittiness" reflects crack propagation rate. It is an end-use characteristic of certain types of film and is not well understood from a fundamentals perspective.

As the polymer exits the annular die, the extrudate cools and its temperature falls below its melting point and it solidifies. The optical properties of the extrudate change as crystallization occurs and a frost line is formed. The position of this frost line above the annular die is a measure of the cooling rate of the film. This cooling rate has a very marked effect on the optical properties of the film produced herein.

The ethylene polymer can also be extruded in the shape of a rod or other solid cross section using the same die geometry for only the external surface. Additionally, the ethylene polymer can also be extruded into pipe through annular dies.

II. Slot Cast Film Extrusion

The films formed as disclosed herein may also be extruded by slot cast film extrusion. This film extrusion method is well known in the art and comprises extruding a sheet of molten polymer through a slot die and then quenching the extrudate using, for example, a chilled casting roll or water bath. In the chill roll process, film may be extruded horizontally and laid on top of the chill roll or it may be extruded downward and drawn under the chill roll. Extrudate cooling rates in the slot cast process are very high. Chill roll or water batch quenching is so fast that as the extrudate cools below its melting point, crystallites nucleate very rapidly, supramolecular structures have little time to grow and spherulites are held to a very small size. The optical properties of slot cast film are vastly improved over those characterizing films using the slow cooling rate, tubular blown film extrusion process. Compound temperatures in the slot cast film extrusion process generally run much higher than those typifying the tubular blown film process. Melt strength is not a process limitation in this film extrusion method. Both shear viscosity and extensional viscosity are lowered. Film can generally be extruded at higher output rate than practiced in the blown film process. The higher temperatures reduce shear stresses in the die and raise the output threshold for melt fracture.

FILM

The film produced by the method of the present invention has a thickness of greater than about 0.10 mils to about 20 mils, preferably greater than about 0.10 to 10 mils, most preferably greater than about 0.10 to 4.0 mils. The 0.10 to 4.0 mil film is characterized by the following properties: a puncture resistance value of greater than about 7.0 in-lbs/mil; an ultimate elongation of greater than about 400%; a thermal shrinkage of less than 3% after heating to 105°–110° C. and cooling to room temperature; tensile impact strength of greater than about 500 to about 2000 ft-lbs/in$^3$ and tensile strength greater than about 2000 to about 7000 psi.

Various conventional additives such as slip agents, antiblocking agents, and antioxidants can be incorporated in the film in accordance with conventional practice.

THE ETHYLENE POLYMERS

The polymers which may be used in the process of the present invention are linear homopolymers of ethylene or linear copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1 and octene-1.

The ethylene polymers have a melt flow ratio of about $\geq 22$ to $\leq 32$, and preferably of about $\geq 25$ to $\leq 30$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1.

The homopolymers have a density of about $\geq 0.958$ to $\leq 0.972$ and preferably of about $\geq 0.961$ to $\leq 0.968$.

The copolymers have a density of about $\geq 0.91$ to $\leq 0.96$ and preferably $\geq 0.917$ to $\leq 0.955$, and most preferably, of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger amounts of the different comonomers would be needed in the order of $C_3 > C_4 > C_5 > C_6 > C_7 > C_8$.

The melt index of a homopolymer or copolymer is a reflection of its molecular weight. Polymers having a relatively high molecular weight, have relatively high viscosities and low melt index. Ultrahigh molecular weight ethylene polymers have a high load (HLMI) melt index of about 0.0 and a very high molecular weight, ethylene polymers have a high load melt index (HLMI) of about 0.0 to about 1.0. The polymers of the present invention have a standard or normal load melt index of $\geq 0.0$ to about 50, and preferably of about 0.5 to 35, and a high load melt index (HLMI) of about 11 to about 950. The melt index of the polymers is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio.

The ethylene polymers of the present invention have an unsaturated group content of $\leq 1$, and usually $\geq 0.1$ to $\leq 0.3$, C—C/1000 carbon atoms, and a cyclohexane extractables content of less than about 3, and preferably less than about 2, weight percent.

Having set forth the general nature of the invention, the following examples illustrate some specific embodiments of the invention. It is to be understood, however, that this invention is not limited to the examples, since the invention may be practiced by the use of various modifications.

EXAMPLE 1

This Example demonstrates the conventional procedures for extruding ethylene polymers into tubes.

An ethylene-butene copolymer which was prepared in accordance with the procedure of U.S. Patent application Ser. No. 892,325 filed Mar. 31, 1978 in the names of F. J. Karol, et al., now abandoned and which is available from Union Carbide Corporation under the Trademark designation Bakelite GRSN 7040 was formed into a tube using a $2\frac{1}{2}$ inch diameter extruder having a standard polyethylene screw with a Maddock mixing section. The copolymer had a density of 0.9197 gm/cc, a melt index of 2.17 decigrams/min, and a melt flow ratio of 24.6. The copolymer was formed into a tube by passing the resin through a conventional $2\frac{1}{2}''$ diameter screw extruder and into a conventional die having a 2 inch land, 1.288 inches die diameter and a pin diameter normally of 1.236 inches. The sides of the die land were parallel with the flow axis of the polymer melt. The resin was extruded through the die at a rate of 23 lbs/hr at a temperature of 300° F. There was severe sharkskin melt fracture observed on both surfaces of the tube.

EXAMPLE 2

This Example demonstrates the improved results over Example 1 by the use of the tapered pin without an offset die lip.

The ethylene-butene copolymer was identical to Example 1. The copolymer was formed into a tube by passing the resin through the conventional $2\frac{1}{2}''$ diameter screw extruder and mixer of Example 1, and into a conventional die having a die exit which had no offset but one of the die lips was tapered. The length of the taper was 0.7 inches and the taper diverged from a die gap of 0.026 inches to 0.080 inches in a straight taper. The resin was extruded through the die at varying rates up to a rate of 37 lbs/hr at a temperature of 300° F. There was no sharkskin melt fracture observed on either surface of the tube.

EXAMPLE 3

This Example demonstrates the improved results obtained by the use of the offset concept of the invention.

The ethylene-butene copolymer was identical to Example 1. The copolymer was formed into a tube by passing the resin through a conventional $2\frac{1}{2}''$ diameter screw extruder and mixer of Example 1 and into a die having an offset of 0.050 inches, formed by the outer wall extending beyond the inner wall (or pin). Other features of the die are as in Example 1. The sides of the die land were parallel with the flow axis of the polymer melt. The resin was extruded through the die at a rate of 23 lbs/hr at a temperature of 300° F. There was no sharkskin melt fracture observed on the exterior surface of the tube but melt fracture on the interior surface.

EXAMPLE 4

This Example demonstrates the superior results obtained by combining the offset concept and the tapered die lip feature.

The ethylene-butene copolymer was identical to Example 1. The copolymer was formed into a tube by passing the resin through a conventional 2½" diameter screw extruder and mixer of Example 1 and into a conventional die having a die exit modified as shown in FIG. 3. The die had an offset of 0.050 inches, formed in the outer wall extending beyond the inner wall, and a die diameter of 1¼ inches. The nonextended die lip was tapered. The length of the taper was 0.7 inches and the taper diverged from a die gap of 0.026 to 0.080 inches. The resin was extruded at variable rates up through 60 lbs/hr, at a temperature of from 300° F. to about 328° F. over the ranges. There was no melt fracture on either surface with good surface gloss.

EXAMPLE 5

This Example demonstrates the conventional procedure for extruding multilayer film in a blown film process. It combines in this example, two rheologically and structurally dissimilar polyolefins.

A multilayer film construction consisting of a 1.0 Melt Index, 0.918 density low pressure low density polyethylene (LPLDPE) and a 2.0 Melt Index, 0.918 density high pressure low density polyethylene (HPLDPE) flowing at a 2:1 volumetric layer ratio was extruded through a 12" diameter 3-channel spiral die. The 1.0 M.I., 0.918 density LPLDPE material was pumped by a 3½" diameter extruder and a 2½" diameter extruder at a flow rate of 244 lbs/hr and exited on the die pin (mandrel) side. The 2.0 M.I., 0.918 density HPLDPE was pumped by a single 2½" diameter extruder at a flow rate of 122 lbs/hr and exited on the die collar side. The total flow rate through the die was 366 lbs/hr or 10 lbs/hr-inch of die. The melt temperatures were 425° F. and 361° F. for the LPLDPE and HPLDPE respectively. The offset was 0.000 inches. Severe sharkskin melt fracture was observed on the LPLDPE surface of the multilayer film.

EXAMPLE 6

This example demonstrates the total reduction in melt fracture due to the use of the offset die concept applied to the LPLDPE side of the die.

The film construction, extrusion rates, temperatures, extrusion conditions and apparatus were the same as in Example 5; however, a 0.06 inch lip offset was incorporated by raising the die pin. No sharkskin melt fracture was detected on either surface of the film.

EXAMPLE 7

This Example demonstrates the major effect the offset has on melt fracture especially for small die gaps.

A 2-layer film construction incorporating LPLDPE in one layer and a mixture of LPLDPE and HPLDPE in the other was manufactured on a 4.0" diameter 2-channel die connected to a 2½" diameter extruder and a 2.0" diameter extruder. An experiment was run to measure the effects of die gap and lip offset on sharkskin melt fracture. The melt fracture was measured on a Bendix Surface Profiler (trade name BENDIX PROFICORDER). Table I lists the extrusion conditions and die design.

The information contained in Table I indicates that lip offset has the largest effect on melt fracture by incorporating a larger lip offset. It is possible to run at higher rates with smaller die gaps and still obtain films with minimal melt fracture.

TABLE I

| Sample | Die Design Gap Inches | Lip Offset Inches | Rate Lbs/hr. per inch of die | Die Temperature 0° F. | Melt Temperature LPLDPE | HP & LP Mixture | Melt Fracture Surface Roughness Inches × 10⁻⁵ |
|---|---|---|---|---|---|---|---|
| 1 | .050 | .190 | 2 | 299 | 362 | 378 | 6.5 |
| 2 | .050 | .190 | 5 | 299 | 375 | 381 | 6.2 |
| 3 | .050 | .190 | 2 | 352 | 368 | 379 | 5.5 |
| 4 | .050 | .190 | 5 | 349 | 369 | 380 | 3.8 |
| 5 | .075 | .190 | 2 | 298 | 368 | 383 | 7.0 |
| 6 | .075 | .190 | 5 | 296 | 383 | 379 | 8.0 |
| 7 | .075 | .190 | 2 | 348 | 372 | 383 | 6.5 |
| 8 | .075 | .190 | 5 | 347 | 380 | 383 | 3.8 |
| 16 | .050 | .090 | 2 | 298 | 370 | 377 | 20.0 |
| 17 | .050 | .090 | 5 | 294 | 390 | 380 | 21.0 |
| 18 | .050 | .090 | 2 | 349 | 365 | 370 | 10.0 |
| 19 | .050 | .090 | 5 | 348 | 390 | 382 | 13.0 |
| 20 | .075 | .090 | 2 | 298 | 370 | 377 | 9.0 |
| 21 | .075 | .090 | 5 | 296 | 370 | 380 | 11.25 |
| 22 | .075 | .090 | 2 | 532 | 363 | 371 | 4.7 |
| 23 | .075 | .090 | 5 | 331 | 391 | 379 | 7.0 |
| 35 | .030 | .190 | 3.5 | 321 | 370 | 379 | 3.7 |
| 40 | .030 | .090 | 3.5 | 321 | 376 | 378 | 25.0 |

EXAMPLE 8

This Example demonstrates product property improvements with the use of the offset die.

The film construction described in Example 5 was extruded through a 12" diameter 3-channel die. The LPLDPE layer was extruded through a 3½" extruder and a 1½" extruder. The HPLDPE layer was extruded through a 1½" extruder. The die gap and lip offset was varied in order to measure the effect on elemendorp tear measurement in the machine direction (M.D. Tear). Table II lists the process conditions and die configurations. The information contained in Table II indicates that die gap has the largest effect on M.D. tear. Reducing the die gap to 30 mils from 110 mils almost doubles the M.D. tear strength of the film. The lip offset allows film constructions incorporating a layer of LPLDPE and HPLDPE to be extruded through dies with small gaps without melt fracture. The use of a small die gap increases the M.D. tear strength of the film.

TABLE II

| Die Design | | Blow Up Ratio | Rate Lbs/hr per inch of die | Melt Temperature 0° F. | | M.D. Tear Grams/Mil |
|---|---|---|---|---|---|---|
| Gap Inches | Lip Offset Inches | | | LPLDPE | HPLDPE | |
| .030 | .060 | 1.7 | 2.7 | 430 | 371 | 141 |
| .030 | .170 | 1.7 | 2.7 | 430 | 380 | 140 |
| .110 | .060 | 1.7 | 2.7 | 445 | 378 | 84 |
| .110 | .170 | 1.7 | 2.7 | 437 | 378 | 80 |
| .050 | .000 | 1.7 | 2.7 | 430 | 375 | 98 |

What is claimed is:

1. A process for reducing melt fracture formed during extrusion of a molten narrow molecular weight distribution, linear, ethylene polymer, under conditions of flow rate and melt temperature which would otherwise produce higher levels of melt fracture which comprises extruding said polymer through a die having a discharge outlet defining an exit die gap formed by opposing die lip surfaces and wherein one surface of the die lip and/or die land in contact with the molten polymer extends beyond the opposing surface of the die lip and/or die land in the direction of the axis of flow of the molten polymer through the die exit whereby melt fracture is reduced on the surface of the polymer leaving the extended die lip surface.

2. A process according to claim 1 wherein said extended die lip extends from about 0.010 inch to about 0.400 inch beyond said opposing die lip surface.

3. A process according to claim 1 wherein said extended die lip extends from about 0.50 inch to about 0.250 inch beyond said opposing die lip surface.

4. A process according to claim 1 or 2 wherein the distance between said die lips is between 0.015 inch to about 0.200 inch.

5. A process according to claim 1 or 2 wherein the distance between said die lips is between 0.020 inch to about 0.100 inch.

6. A process according to claims 1, or 2 wherein said non-extended die lip tapers away from the surface of said extended die lip.

7. A process according to claim 6 wherein said non-extended die lip tapers away from the surface of said extended die lip to provide a diverging surface defining a diverging angle of less than 5° relative to the axis of flow of the molten polymer.

8. A process as in claim 1 wherein the ethylene polymer is formed into blown film.

9. A process as in claim 1 wherein the ethylene polymer is slot cast into film.

10. A process as in claim 1 wherein the ethylene polymer is formed into pipe.

11. A process as in claim 1 wherein the ethylene polymer is a linear low density ethylene hydrocarbon copolymer.

12. A process as in claim 11 in which said copolymer is a copolymer of ethylene and at least one $C_3$ to $C_8$ alpha olefin having a melt index of about $\geq 0.1$ to about $\leq 20$.

13. A process as in claim 12 in which said copolymer is a copolymer of $\geq 90$ mol percent ethylene and $\leq 10$ mol percent of at least one $C_3$ to $C_8$ alpha olefin.

14. A process as in claim 13 in which said copolymer has a molecular weight distribution of about $\geq 2.7$ to $\leq 6.0$ and a total unsaturation content of about $\geq 0.1$ to $\leq 0.3$ C=C/1000 C atoms.

15. A process for reducing melt fracture formed during extrusion of a multilayer film wherein one layer is formed from polymers which are not subject to melt fracture under the conditions of extrusion and wherein the other layer is formed from a molten narrow molecular weight distribution, linear, ethylene polymer, under conditions of flow rate and melt temperature which would otherwise produce higher levels of melt fracture which comprises extruding said polymers not subject to melt fracture and said ethylene polymer through a die having a discharge outlet defining an exit die gap formed by opposing die lip surfaces and wherein one surface of the die lip and/or die land in contact with said ethylene polymer extends beyond the opposing surface of the die lip and/or die land in the direction of the axis of flow of said polymer through the die exit whereby melt fracture is reduced on the surface of said ethylene polymer film leaving the extended die lip surface.

* * * * *